US010509729B2

United States Patent
Sankaran et al.

(10) Patent No.: US 10,509,729 B2
(45) Date of Patent: Dec. 17, 2019

(54) ADDRESS TRANSLATION FOR SCALABLE VIRTUALIZATION OF INPUT/OUTPUT DEVICES

(71) Applicant: Intel Corporation, Santa Clara, CA (US)

(72) Inventors: Rajesh M Sankaran, Portland, OR (US); Randolph L Campbell, Folsom, CA (US); Prashant Sethi, Folsom, CA (US); David J Harriman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/994,393

(22) Filed: Jan. 13, 2016

(65) Prior Publication Data

US 2017/0199827 A1 Jul. 13, 2017

(51) Int. Cl.
| | |
|---|---|
| *G06F 12/10* | (2016.01) |
| *G06F 12/1027* | (2016.01) |
| *G06F 9/455* | (2018.01) |
| *G06F 12/1009* | (2016.01) |
| *G06F 12/1081* | (2016.01) |

(52) U.S. Cl.
CPC ...... *G06F 12/1027* (2013.01); *G06F 9/45558* (2013.01); *G06F 12/1009* (2013.01); *G06F 12/1081* (2013.01); *G06F 2009/45579* (2013.01); *G06F 2009/45583* (2013.01); *G06F 2212/657* (2013.01); *G06F 2212/68* (2013.01)

(58) Field of Classification Search
CPC .......... G06F 12/1009; G06F 17/30339; G06F 17/30377; G06F 2009/3883; G06F 9/3004; G06F 9/3881
See application file for complete search history.

(56) References Cited

U.S. PATENT DOCUMENTS

| | | | | |
|---|---|---|---|---|
| 4,943,913 A | * | 7/1990 | Clark | .................... G06F 9/4843 711/206 |
| 6,600,493 B1 | * | 7/2003 | Sethi | ..................... G06F 12/023 345/542 |
| 6,718,361 B1 | | 4/2004 | Basani et al. | |
| 7,124,170 B1 | * | 10/2006 | Sibert | ................... G06F 12/145 709/216 |

(Continued)

OTHER PUBLICATIONS

"Single Root I/O Virtualization and Sharing Specification," Revision 1.0, PCI-SIG, Sep. 11, 2007, https://pcisig.com/specifications/iov/, 84 pages.

(Continued)

*Primary Examiner* — Prasith Thammavong
*Assistant Examiner* — Alex G Olson
(74) *Attorney, Agent, or Firm* — Nicholson De Vos Webster & Elliott LLP (57) ABSTRACT

Embodiments of an invention for address translation for scalable I/O device virtualization are disclosed. In one embodiment, an apparatus includes PASID table lookup circuitry. The PASID table lookup circuitry is to find a PASID-entry in a PASID table. The PASID-entry is to include a PASID processing mode (PPM) indicator and a first pointer to a first translation structure. The PPM indicator is to specify one of a plurality of translation types, the one of the plurality of translation types to use the first translation structure.

16 Claims, 5 Drawing Sheets

(56) References Cited

U.S. PATENT DOCUMENTS

| | | |
|---|---|---|
| 7,725,305 B2 | 5/2010 | Taillefer et al. |
| 8,473,947 B2 | 6/2013 | Goggin et al. |
| 8,533,713 B2 | 9/2013 | Dong et al. |
| 8,600,726 B1 | 12/2013 | Varshney et al. |
| 8,607,253 B2 | 12/2013 | Oshins et al. |
| 9,213,567 B2 | 12/2015 | Barde et al. |
| 9,424,199 B2 | 8/2016 | Kegel et al. |
| 9,471,494 B2 | 10/2016 | Sankaran et al. |
| 9,519,781 B2 | 12/2016 | Golshan et al. |
| 9,645,766 B1 | 5/2017 | Lecrone et al. |
| 9,645,939 B2 | 5/2017 | Dulloor et al. |
| 9,842,055 B2 * | 12/2017 | Eddy ................ G06F 12/0891 |
| 9,880,867 B2 | 1/2018 | Delco et al. |
| 9,952,987 B2 | 4/2018 | Guddeti et al. |
| 10,007,619 B2 | 6/2018 | Podaima et al. |
| 10,095,444 B1 | 10/2018 | Lecrone et al. |
| 2003/0018876 A1 * | 1/2003 | Zahir ................ G06F 12/1009 711/206 |
| 2003/0188122 A1 * | 10/2003 | Bennett ............. G06F 12/0292 711/202 |
| 2004/0010788 A1 * | 1/2004 | Cota-Robles ......... G06F 9/505 718/1 |
| 2006/0069899 A1 | 3/2006 | Schoinas et al. |
| 2006/0075146 A1 | 4/2006 | Schoinas et al. |
| 2007/0288228 A1 | 12/2007 | Taillefer et al. |
| 2010/0042776 A1 * | 2/2010 | Seo .................. G06F 12/123 711/103 |
| 2011/0022818 A1 | 1/2011 | Kegel et al. |
| 2011/0179413 A1 | 7/2011 | Subramanian et al. |
| 2011/0179414 A1 | 7/2011 | Goggin et al. |
| 2012/0084487 A1 | 4/2012 | Barde et al. |
| 2012/0166690 A1 * | 6/2012 | Regula ............... G06F 13/404 710/104 |
| 2012/0167082 A1 | 6/2012 | Kumar et al. |
| 2012/0246381 A1 | 9/2012 | Kegel et al. |
| 2012/0254862 A1 | 10/2012 | Dong et al. |
| 2013/0067501 A1 | 3/2013 | Oshins et al. |
| 2013/0080714 A1 * | 3/2013 | Kegel ............... G06F 12/1081 711/154 |
| 2013/0117848 A1 | 5/2013 | Golshan et al. |
| 2013/0275715 A1 * | 10/2013 | Caprioli .............. G06F 12/10 711/203 |
| 2014/0068137 A1 * | 3/2014 | Kegel ................ G06F 12/1009 711/6 |
| 2015/0160960 A1 | 6/2015 | Delco et al. |
| 2015/0178202 A1 | 6/2015 | Sankaran et al. |
| 2015/0242227 A1 * | 8/2015 | Nair ................... G06F 21/60 718/1 |
| 2015/0319250 A1 | 11/2015 | Vasudevan et al. |
| 2016/0147679 A1 | 5/2016 | Guddeti et al. |
| 2016/0350234 A1 * | 12/2016 | Podaima ............ G06F 12/1063 |
| 2016/0378672 A1 | 12/2016 | Dulloor et al. |
| 2017/0083360 A1 | 3/2017 | Adams et al. |
| 2017/0097835 A1 | 4/2017 | Tzen et al. |
| 2017/0228233 A1 | 8/2017 | Mishaeli et al. |
| 2017/0286302 A1 | 10/2017 | Roy et al. |
| 2017/0364377 A1 | 12/2017 | Koller et al. |
| 2018/0004562 A1 | 1/2018 | Huntley et al. |
| 2018/0189104 A1 | 7/2018 | Agarwal et al. |

OTHER PUBLICATIONS

"PCI-SIG SR-IOV Primer," Revision 2.5, Intel Corporation, Jan. 2011, https://www-ssl.intel.com/content/dam/doc/application-note/pci-sig-sr-iov-primer-sr-iov-technology-paper.pdf, 28 pages.

Agarwal S., et al., "Scalable Network Path Emulation," 13th IEEE International Symposium on Modeling, Analysis, and Simulation of Computer and Telecommunication Systems, Sep. 2005, 10 pages.

Ahrenholz J., et al., "CORE: A Real-Time Network Emulator," Military Communications Conference 2008, MILCOM 2008, Nov. 2008, 7 pages.

Elgebaly M., et al., "Efficient Adaptive Voltage Scaling System Through On-Chip Critical Path Emulation," Proceedings of the 2004 International Symposium on Low Power Electronics and Design, Aug. 2004, ISLPED'04, pp. 375-380.

International Preliminary Report on Patentability for Application No. PCT/US2016/066375, dated Jul. 26, 2018, 12 pages.

International Search Report and Written Opinion for Application No. PCT/US2016/066375, dated Mar. 29, 2017, 11 pages.

Mihocka D., et al., "Virtualization Without Direct execution or Jitting: Designing a Portable Virtual Machine Infrastructure," 1st Workshop on Architectural and Microarchitectural Support for Binary Translation in ISCA-35, Beijing, 2008, 16 pages.

Notice of Allowance from U.S. Appl. No. 15/584,979, dated Oct. 24, 2018, 15 pages.

Waldspurger C., et al., "I/O Virtualization," Communications of the ACM, Jan. 2012, vol. 55 (1), pp. 66-72.

* cited by examiner

PASID-entry 400

| first-level pointer 410 | second-level pointer 420 | PPD 430 |

FIGURE 5
METHOD 500

ADDRESS TRANSLATION FOR SCALABLE VIRTUALIZATION OF INPUT/OUTPUT DEVICES

BACKGROUND

1. Field

The present disclosure pertains to the field of information processing, and more particularly, to the field of virtualization in information processing systems.

2. Description of Related Art

Generally, the concept of virtualization in information processing systems allows multiple instances of one or more operating systems (each, an OS) to run on a single information processing system, even though each OS is designed to have complete, direct control over the system and its resources. Virtualization is typically implemented by using software (e.g., a virtual machine monitor (VMM) or hypervisor) to present to each OS a virtual machine (VM) having virtual resources, including one or more virtual processors, that the OS may completely and directly control, while the VMM maintains a system environment for implementing virtualization policies such as sharing and/or allocating the physical resources among the VMs (the virtual environment).

BRIEF DESCRIPTION OF THE FIGURES

The present invention is illustrated by way of example and not limitation in the accompanying figures.

DETAILED DESCRIPTION

Embodiments of an invention for address translation for scalable virtualization of input/output devices are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type or of or content of a storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

Also, as used in descriptions of embodiments of the present invention, a "/" character between terms may mean that an embodiment may include or be implemented using, with, and/or according to the first term and/or the second term (and/or any other additional terms).

As described in the background section, information processing systems may provide for virtualization of resources. These resources may include input/output (I/O) devices, where the definition of I/O devices may include controllers (such as bus, interconnect, and/or fabric controllers, network interface controllers (NICs), etc.), processors/accelerators (such as graphics processors, cryptographic and/or compression accelerators, etc.), and any other resources that may be addressed in the system. Various approaches to and usages of virtualization have been and continue to be developed, including those with many (hundreds to thousands or more) of VMs or other containers (e.g., OS-managed separate and/or isolated execution environments), where any number of I/O devices may be used and/or shared at various times by any number of VMs or containers. Therefore, embodiments of the present invention may be desired to provide for efficient and scalable virtualization of I/O devices.

Figure 1:
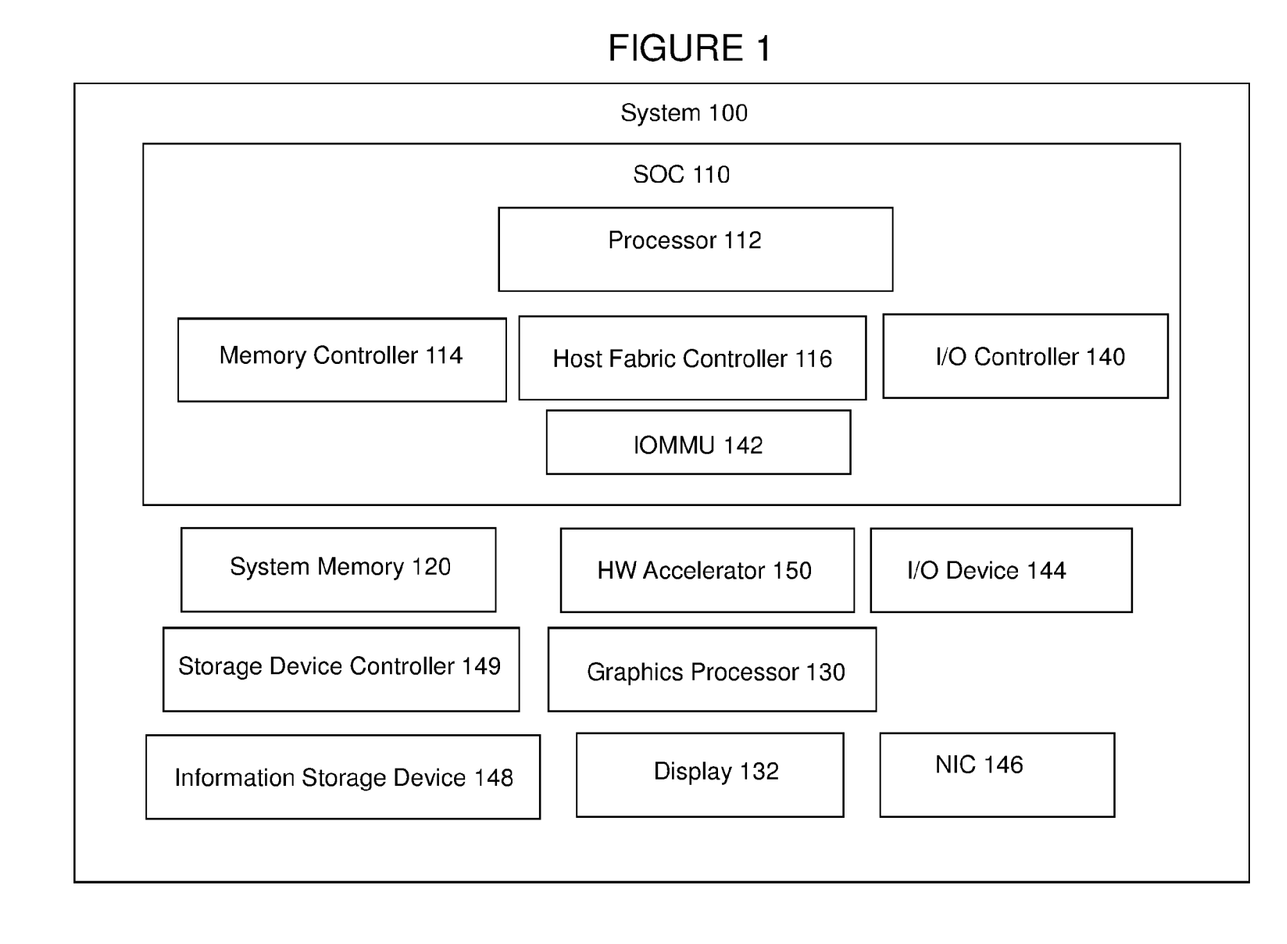
FIG. 1 illustrates a system including address translation for scalable virtualization of input/output devices according to an embodiment of the present invention.

FIG. 1 illustrates system 100, an information processing system including an embodiment of the present invention for address translation for scalable virtualization of I/O devices. System 100 may represent any type of information processing system, such as a server, a desktop computer, a portable computer, a set-top box, a hand-held device such as a tablet or a smart phone, or an embedded control system. System 100 includes processor 112, memory controller 114, host fabric controller 116, I/O controller 140, I/O memory management unit (IOMMU) 142, system memory 120, graphics processor 130, and hardware accelerator 150. Systems embodying the present invention may include any number of each of these components and any other components or other elements, such as additional peripherals and/or I/O devices. Any or all of the components or other elements in this or any system embodiment may be connected, coupled, or otherwise in communication with each other through any number of buses, point-to-point, or other wired or wireless interfaces or connections, unless specified otherwise. Any components or other portions of system 100, whether shown in FIG. 1 or not shown in FIG. 1, may be integrated or otherwise included on or in a single chip (a system-on-a-chip or SOC), die, substrate, or package, such as SOC 110.

System memory 120 may be dynamic random access memory (DRAM) or any other type of medium readable by processor 112. Memory controller 114 may represent any circuitry or component for accessing, maintaining, and/or otherwise controlling system memory 120. Host fabric controller may represent 116 may represent any circuitry or component for controlling an interconnect network or fabric through which processors and/or other system components may communicate. Graphics processor 130 may include any processor or other component for processing graphics data for display 132. Hardware accelerator 150 may represent any cryptographic, compression, or other accelerator to which a processor may offload functionality such as the hardware acceleration of encryption or compression algorithms.

I/O controller 140 may represent any circuitry or component, such as a chipset component, including or through which peripheral, input/output (I/O), or other components or devices, such as I/O device 144 (e.g., a touchscreen, keyboard, microphone, speaker, other audio device, camera, video or other media device, motion or other sensor, receiver for global positioning or other information, etc.), NIC 146, and/or information storage device 148, may be connected or coupled to processor 112. Information storage device 148 may represent any one or more components including any one more types of persistent or non-volatile memory or storage, such as a flash memory and/or a solid state, magnetic, or optical disk drive, and may include its own controller 149.

Processor 112 may represent all or part of a hardware component including one or more processors or processor cores integrated on a single substrate or packaged within a single package, each of which may include multiple execution threads and/or multiple execution cores, in any combination. Each processor represented as or in processor 112 may be any type of processor, including a general purpose microprocessor, such as a processor in the Intel® Core® Processor Family or other processor family from Intel® Corporation or another company, a special purpose processor or microcontroller, or any other device or component in an information processing system in which an embodiment of the present invention may be implemented. Processor 112 may be architected and designed to operate according to any instruction set architecture (ISA), with or without being controlled by microcode.

Processor 112 may support virtualization according to any approach. For example, processor 112 may operate in two modes—a first mode in which software runs directly on the hardware, outside of any virtualization environment, and a second mode in which software runs at its intended privilege level, but within a virtual environment hosted by a VMM running in the first mode. In the virtual environment, certain events, operations, and situations, such as interrupts, exceptions, and attempts to access privileged registers or resources, may be intercepted, i.e., cause the processor to exit the virtual environment (a VM exit) so that the VMM may operate, for example, to implement virtualization policies. The processor may support instructions for establishing, entering (a VM entry), exiting, and maintaining a virtual environment, and may include register bits or other structures that indicate or control virtualization capabilities of the processor.

Figure 2:
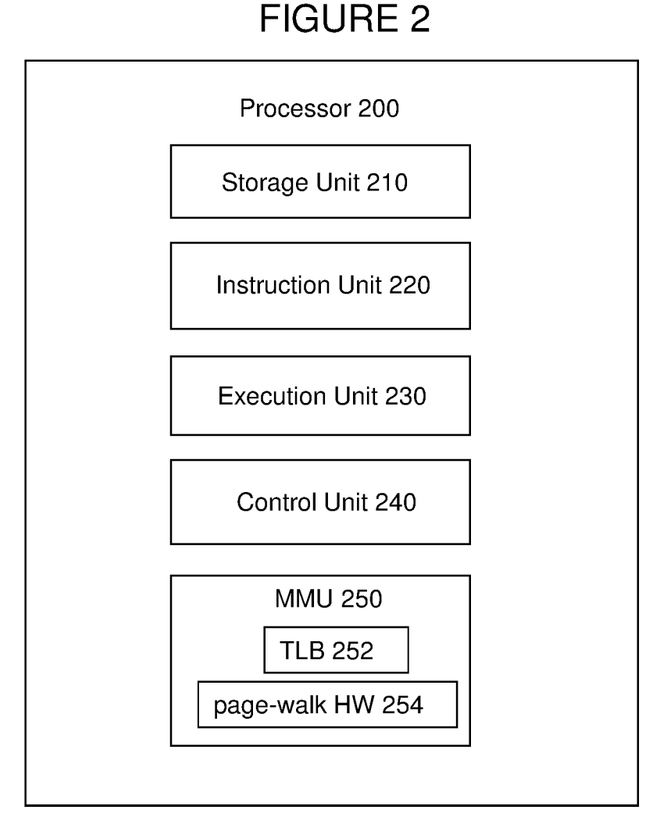
FIG. 2 illustrates a processor in the system of FIG. 1.

FIG. 2 illustrates processor 200, which may represent an embodiment of processor 112 in FIG. 1 or an execution core of a multicore processor embodiment of processor 112 in FIG. 1. Processor 200 may include storage unit 210, instruction unit 220, execution unit 230, control unit 240, and memory management unit (MMU) 250. Processor 200 may also include any other circuitry, structures, or logic not shown in FIG. 1.

Storage unit 210 may include any combination of any type of storage usable for any purpose within processor 200; for example, it may include any number of readable, writable, and/or read-writable registers, buffers, and/or caches, implemented using any memory or storage technology, in which to store capability information, configuration information, control information, status information, performance information, instructions, data, and any other information usable in the operation of processor 200, as well as circuitry usable to access such storage and/or to cause or support various operations and/or configurations associated with access to such storage.

Instruction unit 220 may include any circuitry, logic, structures, and/or other hardware, such as an instruction decoder, to fetch, receive, decode, interpret, schedule, and/or handle instructions to be executed by processor 200. Any instruction format may be used within the scope of the present invention; for example, an instruction may include an opcode and one or more operands, where the opcode may be decoded into one or more micro-instructions or micro-operations for execution by execution unit 230. Operands or other parameters may be associated with an instruction implicitly, directly, indirectly, or according to any other approach.

Execution unit 230 may include any circuitry, logic, structures, and/or other hardware, such as arithmetic units, logic units, floating point units, shifters, etc., to process data and execute instructions, micro-instructions, and/or micro-operations. Execution unit 230 may represent any one or more physically or logically distinct execution units.

Control unit 240 may include any microcode, firmware, circuitry, logic, structures, and/or hardware to control the operation of the units and other elements of processor 200 and the transfer of data within, into, and out of processor 200. Control unit 240 may cause processor 200 to perform or participate in the performance of method embodiments of the present invention, such as the method embodiments described below, for example, by causing processor 200, using execution unit 230 and/or any other resources, to execute instructions received by instruction unit 220 and micro-instructions or micro-operations derived from instructions received by instruction unit 220. The execution of instructions by execution 230 may vary based on control and/or configuration information stored in storage unit 210.

MMU 250 may include any circuitry, logic, structures, and/or other hardware to manage system memory, such as providing for the virtualization of physical memory according to any desired approach and the protection of system memory. In an embodiment, MMU 250 supports the use of virtual memory to provide software, including software running in a VM, with an address space for storing and accessing code and data that is larger than the address space of the physical memory in the system, e.g., system memory 120. The virtual memory space of processor 200 may be limited only by the number of address bits available to software running on the processor, while the physical memory space of processor 200 may be limited to the size of system memory 120. MMU 250 supports a memory management scheme, such as paging, to swap the executing software's code and data in and out of system memory 120 on an as-needed basis. As part of this scheme, the software may access the virtual memory space of the processor with an un-translated address that is translated by the processor to a translated address that the processor may use to access the physical memory space of the processor.

Accordingly, MMU 250 may include translation lookaside buffer 252 in which to store translations of a virtual, logical, linear, or other un-translated address to a physical or other translated address, according to any known memory management technique, such as paging. To perform these address translations, MMU 250 may include page-walk hardware 254 to refer to one or more data structures stored in processor 200, system memory 130, storage locations in system 100 not shown in FIG. 1, and/or any combination of these locations. These data structures may include page directories, page tables, and other paging data structures according to any known paging architecture. Each such paging data structure, as well as TLB 252, may include (or have associated with individual or groups of entries) one or more bits or other indicators to be used to indicate and enforce various permissions (e.g., read, write, or execute) that may define or restrict access to pages (or other regions) of memory.

The virtualization capabilities of processor along with MMU 250 may provide for various approaches to creating and maintaining containers, where a container may be any execution or processing environment, created and maintained by a hypervisor, VMM, OS, or any other system or host software. Any platform, system, or machine, including the "bare metal" platform shown as system 100 in FIG. 1 as well as any VM or other container abstracted from a bare metal platform, from which one or more containers are abstracted may be referred to as a host or host machine, and each VM or other such container abstracted from a host machine may be referred to as a guest or guest machine. Accordingly, the term "host software" may mean any hypervisor, VMM, OS, or any other software that may run, execute, or otherwise operate on a host machine and create, maintain, and/or otherwise manage one or more containers, and the term "guest software" may mean any OS, system, application, user, or other software that may run, execute, or otherwise operate on a guest machine. Note that in a layered container architecture, software may be both host software and guest software. For example, a first VMM running on a bare metal platform may create a first VM, in which a second VMM may run and create a second VM abstracted from the first VM, in which the case the second VMM is both host software and guest software.

For convenience, the use of the term "container process" may mean any context, task, application, software, privileged process, unprivileged process, kernel-mode process, supervisor-mode process, user-mode process, or any other process running or runnable within a container. A container may have an address space (a container address space or a guest address space) that is different from the system address space (e.g., the address space of system memory 120) or the host address space (e.g. the address space of the host machine). An address with which the system address space may be directly accessed (i.e., without translation) may be referred to as a host physical address (HPA). For isolation, protection, or any other purpose, any container address space may be different from any other container address space. Therefore, each container process may access memory using addresses that are to be translated, filtered, or otherwise processed to HPAs differently than they are translated, filtered, or otherwise processed for any other container. The difference in translation/processing of container addresses may be due to virtualization and isolation of container address spaces (e.g., guest software may use guest virtual addresses (GVAs) that are translated to guest physical address spaces (GPAs) that are translated to HPAs) and may also be due to the use of a variety of different types of containers (e.g., VMs, OS-managed containers, etc.) and/or different container architectures (e.g., layered architectures including VMs hosting multiple VMs, VMs hosting multiple OS-managed containers, etc.).

An address used by a container process to access memory (a container address) may be any of many different types of addresses, including an HPA, a virtual address, a guest physical address (GPA), a guest virtual address (GVA), a direct memory access (DMA) address, etc., and may go through one or more of any of a variety of techniques, types, levels, layers, rounds, and/or steps of translation, filtering, and/or processing, in any combination, using any of a variety of data structures (e.g., page tables, extended page table, nested page tables, DMA translation tables, memory access filters, memory type filters, memory permission filters, etc.) to result in an HPA and/or in a fault, error, or any other type of determination that a requested access is not allowed. Various approaches may include layering and/or nesting of containers (e.g., a VMM hosting a VM running a guest OS, the guest OS supporting multiple containers; a VMM hosting multiple VMs each running a guest OS, etc.), involving various combinations of address translation techniques.

Each physical function within an I/O device in system 100 may become usable and/or shareable by one or more clients (e.g., containers, container processes, host processes, etc.) by reporting to system software the number of "command portals" that it supports, where a command portal is a command interface through which a client may submit a work request to the I/O device (e.g., through a portal driver). For example, a command portal for a NIC (e.g., NIC 146) may be a paired transmit queue and receive queue; a command portal for an InfiniBand, remote DMA (RDMA), or other host fabric controller (e.g., host fabric controller 116) may be a Queue Pair; a command portal for a Non-Volatile Memory Express (NVMe) or other storage device controller (e.g., storage device controller 149) may be a Command Queue; a command portal for a graphics processing unit (GPU), general purpose computing on GPU (GPGPU), or other accelerator (e.g., hardware accelerator 150) may be a schedulable context through which work may be submitted; etc. A command portal may be distinguished from an "admin portal" as being an interface for a client to submit work, whereas an admin portal is an interface through which a container host sets up or configures the command portals.

An I/O device may report to host software that it supports one or more command portals for use according to embodiments of the present invention, as well as how many command portals it supports, through capability/attribute information that it provides according to a system bus or interconnect specification (e.g., through a new capability added to the Peripheral Component Interconnect Express (PCIe) specification), by a device driver for the physical function, or according to any other known technique for reporting physical function capabilities/attributes.

Then, the host software may use the I/O device's admin portal to allocate, map, and/or assign each command portal to a client. This assignment includes assigning a process address space identifier (PASID) to the command portal, where the PASID corresponds to the address space associated with the client. In an embodiment, a PASID may be a 20-bit tag defined by the PCIe specification and carried by the translation layer packet (TLP) prefix header in transactions generated by the I/O device. After the assignment of a command portal has been completed, clients may submit work requests to it according to any known approach.

Figure 3:
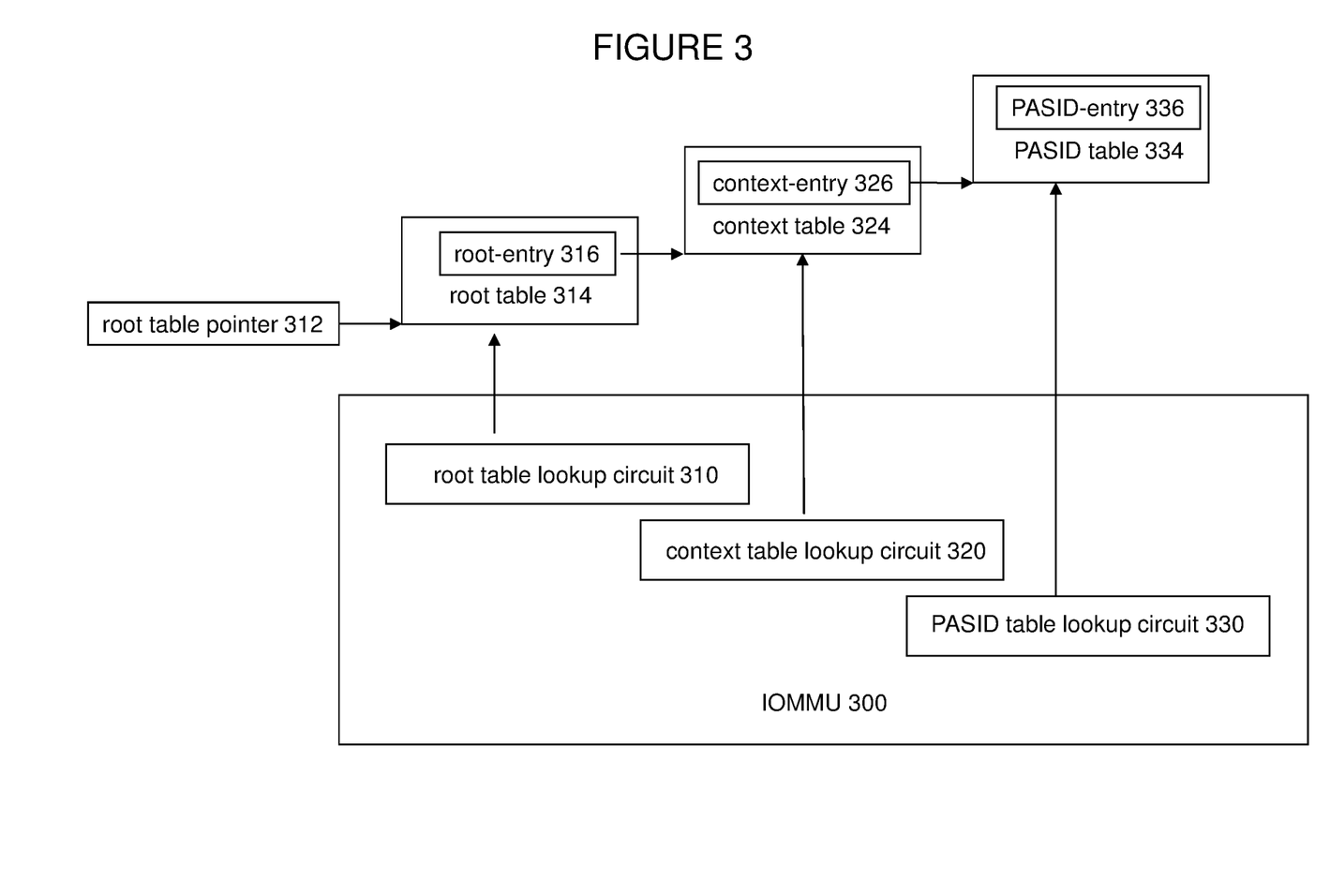
FIG. 3 illustrates an input/output memory management unit according to an embodiment of the present invention.

FIG. 3 illustrates IOMMU 300 for address translation for scalable virtualization of I/O devices according to an embodiment of the present invention. An IOMMU such as IOMMU 300 may represent an embodiment of IOMMU 142 in FIG. 1 and/or may be integrated into an I/O controller such as I/O controller 140, a processor such as processor 112, and/or an SOC such as SOC 110. An IOMMU according to embodiments of the present invention supports the efficient and scalable assignment of a command portal of any type of I/O device to any type of client by providing for any of a variety of types of client address to HPA address translations to be performed, where the type of translation to be performed is determined based on a PASID associated with an I/O transaction, as further described below.

IOMMU 300 may include root table lookup circuitry 310 to find an entry in a root table, such as root table 314. Root table 314 may be a data structure in local memory of IOMMU 300, in system memory 120, and/or elsewhere in system 100, in which one or more root-entries (e.g., root-entry 316) may be stored. Root table 314 may have a root table base address stored in a root table pointer storage location 312. Root table lookup circuitry 310 may include circuitry to add a root table index to the root table base address, where the root table index may correspond to a bus number in an embodiment in which an identifier of an I/O device may include a bus number. For example, an I/O device in a system including a PCIe bus may be assigned a bus number, device number, and function number (BDF) by system configuration software or firmware.

IOMMU 300 may also include context table lookup circuitry 320 to find an entry in a context table, such as context table 324. Context table 324 may be a data structure in local memory of IOMMU 300, in system memory 120, and/or elsewhere in system 100, in which one or more context-entries (e.g., context-entry 326) may be stored. Embodiments of the present invention may include any number of context tables, each with any number of context-entry locations. Context table 324 may have a context table base address stored in a root-entry location (e.g., root-entry 316). Context table lookup circuitry 320 may include circuitry to add a context table index to the context table base address, where the context table index may correspond to a device and function number in an embodiment in which an identifier of an I/O device may include a device and function number (e.g., a PCIe BDF).

IOMMU 300 may also include PASID table lookup circuitry 330 to find an entry in a PASID table, such as PASID table 334. PASID table 334 may be a data structure in local memory of IOMMU 300, in system memory 120, and/or elsewhere in system 100, in which one or more PASID-entries (e.g., PASID-entry 336) may be stored. Embodiments of the present invention may include any number of PASID tables, each with any number of PASID-entry locations. PASID table 334 may have a PASID table base address stored in a context-entry location (e.g., context-entry 326). PASID table lookup circuitry 330 may include circuitry to add a PASID table index to the PASID table base address, where the PASID table index may correspond to a PASID.

Figure 4:
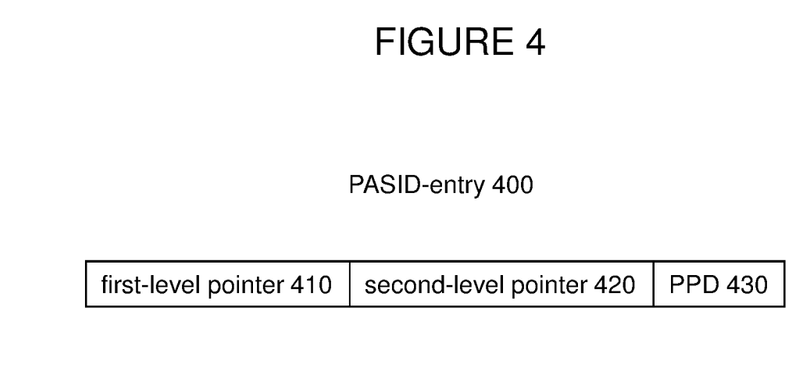
FIG. 4 illustrates a PASID-entry format according to an embodiment of the present invention.

Each PASID-entry may include any number of fields to facilitate translation of any of a variety of address types that may be carried by or otherwise associated with a transaction initiated by a command portal. FIG. 4 illustrates PASID-entry format 400 according to an embodiment of the present invention.

PASID-entry 400 includes first-level translation pointer 410, second-level translation pointer 420, and PASID processing mode (PPM) field 430. First-level translation pointer 410 may be a pointer to a first-level translation data structure, e.g., a first hierarchy of page tables stored in system memory 120. Second-level translation pointer 420 may be a pointer to a second-level translation data structure, e.g., a second hierarchy of page tables stored in system memory 120. PPM field may store a PPM indicator to specify which of a variety of modes of translation is to be performed. For example, a first mode of translation may use only the first-level translation data structure, a second mode of translation may use only the second-level translation data structure, and a third mode may use both the first-level and the second-level translation data structures according to a nested or extended translation technique. Therefore, host software may program the PPM field for each PASID-entry, such that a variety of translation techniques may be used on a per-PASID granularity, and any command portal may be assigned to any of variety of types of client, each client using any of a variety of types of addresses (e.g., restricted HPA, GPA, virtual, GVA, DMA, etc.)

Therefore, a PASID carried or otherwise associated with a transaction by an I/O device in system 100 may be used by IOMMU 300 to initiate any type of a variety of types of address translation. The I/O transaction may be a memory read, a memory write, an atomic memory read/write, or any other transaction that includes accessing system memory.

As a first example, an I/O device may be a user-mode capable device allocated to operate in shared virtual memory space with host applications, the I/O device having a command portal to which a first PASID has been assigned. The command portal may initiate an I/O transaction including a memory address to be accessed, an identifier of the I/O device (e.g., a BDF) and the first PASID, from which the IOMMU may find a first PASID-entry. The first PASID-entry may include a pointer to a first-level translation structure that is a page table hierarchy to translate virtual addresses (in the virtual address space of processor 112) to HPAs. The first PASID-entry may also include a PPM specifying that only a first-level translation is to be performed. Therefore, the memory address included in or associated with the I/O transaction may be a virtual address.

As a second example, an I/O device may have a command portal allocated to a VM and to which a second PASID has been assigned. The command portal may initiate an I/O transaction including a memory address to be accessed, an identifier of the I/O device (e.g., a BDF) and the second PASID, from which the IOMMU may find a second PASID-entry. The second PASID-entry may include a pointer to a second-level translation structure that is a page table hierarchy to translate GPAs (in the physical address space of the VM) to HPAs. The second PASID-entry may also include a PPM specifying that only a second-level translation is to be performed. Therefore, the memory address included in or associated with the I/O transaction may be a GPA.

As a third example, an I/O device may have a command portal allocated to an OS-managed container in a VM and to which a third PASID has been assigned. The command portal may initiate an I/O transaction including a memory address to be accessed, an identifier of the I/O device (e.g., a BDF) and the third PASID, from which the IOMMU may find a third PASID-entry. The third PASID-entry may include a first pointer to a first-level translation structure that is a page table hierarchy to translate virtual addresses (in the virtual address space of the container) to GPAs (in the physical address space of the VM) and second pointer to a second-level translation structure that is a page table hierarchy to translate GPAs (in the physical address space of the VM) to HPAs. The third PASID-entry may also include a PPM specifying that an extended or nested translation, using both the first-level and second-level translation structures, is to be performed. Therefore, the memory address included in or associated with the I/O transaction may be a GVA.

As a fourth example, an I/O device may have a command portal allocated to operate within a restricted HPA space, and to which a fourth PASID has been assigned. The command portal may initiate an I/O transaction including a memory address to be accessed, an identifier of the I/O device (e.g., a BDF) and the fourth PASID, from which the IOMMU may find a fourth PASID-entry. The fourth PASID-entry may include a pointer to a translation structure that is a filter to restrict access to a range or ranges of HPAs. The fourth PASID-entry may also include a PPM specifying that a translation is to be performed using the HPA filter. Therefore, the memory address included in or associated with the I/O transaction may be an HPA.

As a fifth example, an I/O device may have a command portal allocated to operate within an OS-based container having a DMA address space mapped to the HPA address space, and to which a fifth PASID has been assigned. The command portal may initiate an I/O transaction including a memory address to be accessed, an identifier of the I/O device (e.g., a BDF) and the fifth PASID, from which the IOMMU may find a fifth PASID-entry. The fifth PASID-entry may include a pointer to a translation structure that is a DMA address to HPA mapping structure. The fifth PASID-entry may also include a PPM specifying that a translation is to be performed using the DMA mapping structure. Therefore, the memory address included in or associated with the I/O transaction may be a DMA address.

Embodiments of the present invention may support backwards compatibility by with a translation-type field in context-entries, where the translation-type field may be configured by host software to specify a translation type. A first translation type (e.g., scalable I/O virtualization) may be used to enable the IOMMU to operate according to embodiments of the present invention, for example by blocking I/O transactions that do not carry or include a PASID. A second translation type (e.g., single-root I/O virtualization or SR-IOV) may be used to enable the IOMMU to operate according to a different architecture (e.g., PCIe SR-IOV), for example, by supporting (according to a previously known technique) I/O transactions that do not carry or include a PASID.

Various embodiments of the present invention may also include, in an IOMMU, support for scalable interrupt resource allocation for each command portal. For example, configuration of a command portal by host software may include assignment of an interrupt message address/data value pair to the command portal. An I/O device may use local or implementation specific storage to store the interrupt message address/data value for each of its command portals. For example, for a GPU context, the interrupt message address/data value may be saved in memory as part of the context supervisory state that is loaded by the GPU in connection with scheduling the GPU context.

Then, in connection with generated an interrupt (or other event), the command portal may perform a posted write using the address/data value pair, for which host software has configured the IOMMU to generate the appropriate type of interrupt. Interrupt types may include host kernel (kernel interrupt targeting a logical processor), virtual kernel (kernel interrupt targeting a virtual processor), host user (user interrupt targeting a host application thread), virtual user (user interrupt targeting a guest application thread), etc.

Alternatively, a physical function of an I/O device may support its own table structure in which each entry may be configured as an interrupt resource for one of multiple command portals (i.e., each command portal may use one or more entries in the table). Host software may program each entry with an interrupt message address/data value pair to specify the type of interrupt.

Software to support embodiments of the present invention may include VMMs or other system software, scalable I/O managers, device drivers, and command portal drivers. A VMM or other system software may create, maintain, and/or manage containers; map I/O device resources to clients; and program IOMMU resources (including translation structures and interrupt resources) according to requests from a scalable I/O manager.

A scalable I/O manager may operate as a layer or other part of the system software to detect, allocate, and configure scalable I/O resources, according to embodiments of the present invention, and allocate command portals to clients. Its interactions with devices are abstracted through interfaces with device drivers.

A device driver may be associated with each physical function of an I/O device and may be loaded/executed as part of the host OS or VMM I/O software stack. It may accept requests from system software or a scalable I/O manager software stack to help configure the device to support scalable I/O. For example, it may execute requests for enumeration and/or configuration of command portals by programming the device through an admin portal. For example, it may execute, through the admin portal, a request to assign a PASID and an interrupt message address/data pair value to a command portal.

A command portal driver may be implemented as a kernel-mode driver for a kernel clients or a user-mode driver for user clients to which a command portal may be allocated and mapped. It operates with awareness of the specific hardware/software interface of the command portal, the work request completion schemes supported by the device (e.g., kernel interrupts, user interrupts, semaphores, etc.), any shared work queues, and/or any queuing instructions supported by the device.

Figure 5:
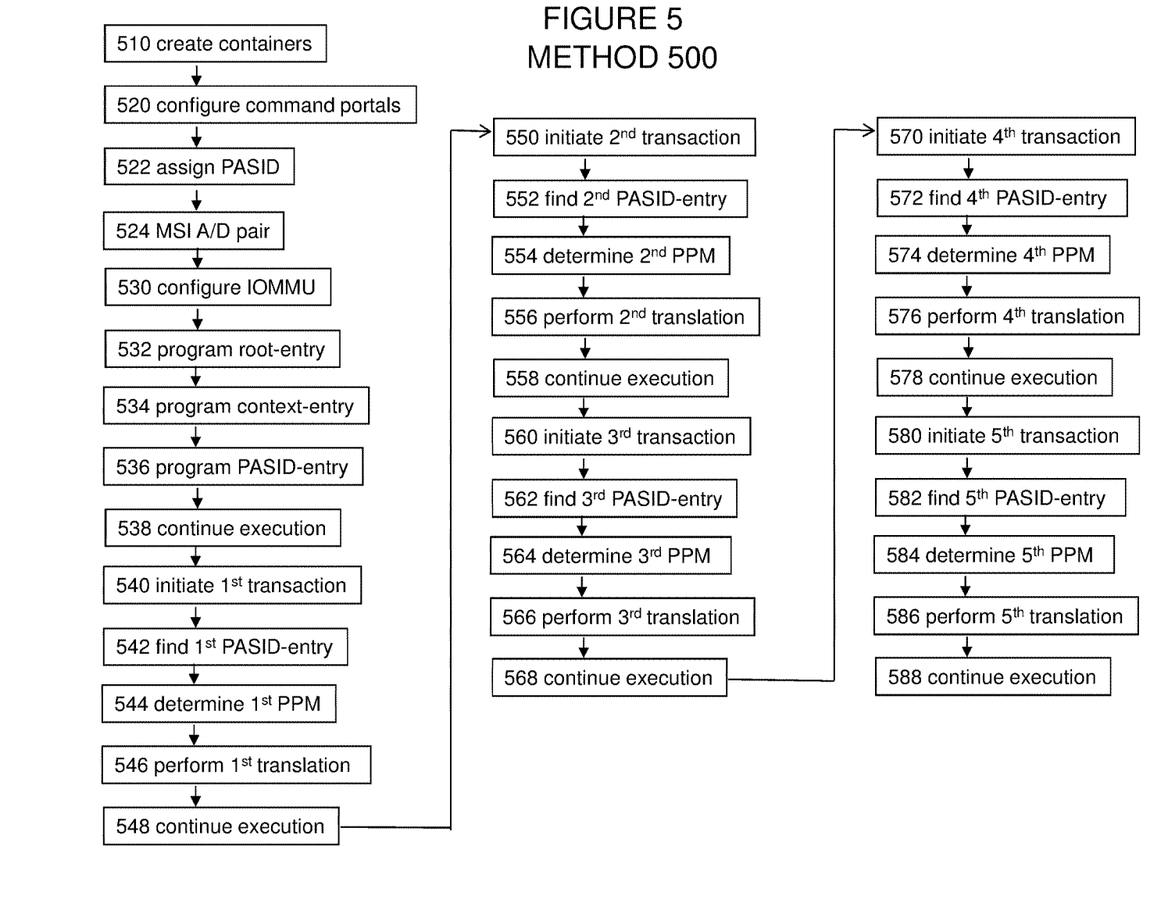
FIG. 5 illustrates a method for address translation for scalable virtualization of input/output devices according to an embodiment of the present invention.

FIG. 5 illustrates method 500 for address translation for scalable virtualization of I/O devices according to an embodiment of the present invention. Although method embodiments of the invention are not limited in this respect, reference may be made to elements of FIGS. 1, 2, 3, and 4 to help describe the method embodiment of FIG. 5. Various portions of method 500 may be performed by hardware, firmware, software, and/or a user of a system such as system 100.

In box 510 of method 500, host software may create one or more containers on an information processing system (e.g., system 100).

In box 520, any number of command portals supported by any number of I/O devices in the system may be configured, including, in box 522, assigning a PASID to each command portal and, in box 524, assigned an interrupt message address/data value pair to each command portal.

In box 530, an IOMMU (e.g., IOMMU 300) may be configured, including, in box 532, programming any number of root-entries; in box 534, programming any number of context-entries; in box 536, programming any number of PASID-entries. In box 538, execution of any one or more processes on system 100 continues.

In box 540, a first memory access transaction may be initiated by a first command portal. In box 542, the IOMMU may use a first requester identifier and a first PASID from the first transaction to find a first PASID-entry. In box 544, the IOMMU may use a first PPM in the first PASID-entry to determine that a first address provided by the first transaction is to be translated using a first translation structure pointed to by a first pointer in the first PASID-entry, where the first address is a virtual address and the first translation structure is a page table hierarchy to translate virtual addresses to HPAs. In box 546, the translation is performed. In box 548, execution of any one or more processes on system 100 continues.

In box 550, a second memory access transaction may be initiated by a second command portal. In box 552, the IOMMU may use a second requester identifier and a second PASID from the second transaction to find a second PASID-entry. In box 554, the IOMMU may use a second PPM in the second PASID-entry to determine that a second address provided by the second transaction is to be translated using a second translation structure pointed to by a second pointer in the second PASID-entry, where the second address is a GPA and the second translation structure is an extended page table hierarchy to translate GPAs to HPAs. In box 556, the translation is performed. In box 558, execution of any one or more processes on system 100 continues.

In box 560, a third memory access transaction may be initiated by a third command portal. In box 562, the IOMMU may use a third requester identifier and a third PASID from the third transaction to find a third PASID-entry. In box 564, the IOMMU may use a third PPM in the third PASID-entry to determine that a third address provided by the third transaction is to be translated according to a nested approach, using a third translation structure and a fourth translation structure, pointed to by a third pointer and a fourth pointer, respectively, in the third PASID-entry, where the third address is a GVA and the third translation structure is a page table hierarchy to translate GVAs to GPAs and the fourth translation structure is a nested or extended page table hierarchy to translate GPAs to HPAs. In box 566, the translation is performed. In box 568, execution of any one or more processes on system 100 continues.

In box 570, a fourth memory access transaction may be initiated by a fourth command portal. In box 572, the IOMMU may use a fourth requester identifier and a fourth PASID from the fourth transaction to find a fourth PASID-entry. In box 574, the IOMMU may use a fourth PPM in the fourth PASID-entry to determine that a fourth address provided by the fourth transaction is to be translated using a fifth translation structure pointed to by a fifth pointer in the fourth PASID-entry, where the fourth address is an HPA and the fifth translation structure is an HPA filter to restrict access to a range of HPA addresses. In box 576, the filtering is performed. In box 578, execution of any one or more processes on system 100 continues.

In box 580, a fifth memory access transaction may be initiated by a fifth command portal. In box 582, the IOMMU may use a fifth requester identifier and a fifth PASID from the fifth transaction to find a fifth PASID-entry. In box 584, the IOMMU may use a fifth PPM in the fifth PASID-entry to determine that a fifth address provided by the fifth transaction is to be translated using a sixth translation structure pointed to by a sixth pointer in the fifth PASID entry, where the fifth address is a DMA address and the sixth translation structure is a DMA map to translate DMA addresses to HPAs. In box 586, the translation is performed. In box 588, execution of any one or more processes on system 100 continues.

In various embodiments of the present invention, the method illustrated in FIG. 4 may be performed in a different order, with illustrated boxes combined or omitted, with additional boxes added, or with a combination of reordered, combined, omitted, or additional boxes. Furthermore, method embodiments of the present invention are not limited to method 400 or variations thereof. Many other method embodiments (as well as apparatus, system, and other embodiments) not described herein are possible within the scope of the present invention.

Embodiments or portions of embodiments of the present invention, as described above, may be stored on any form of a machine-readable medium. For example, all or part of method 400 may be embodied in software or firmware instructions that are stored on a medium readable by a processor, which when executed by a processor, cause the processor to execute an embodiment of the present invention. Also, aspects of the present invention may be embodied in data stored on a machine-readable medium, where the data represents a design or other information usable to fabricate all or part of a processor or other component.

Thus, embodiments of an invention for address translation for scalable I/O device virtualization have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
   process address space identifier (PASID) table lookup circuitry to use a PASID from a memory access transaction to find a PASID-entry in a PASID table, wherein the PASID is assigned to a command portal through which a client is to submit a work request to an input/output device;
   the PASID-entry to include a PASID processing mode (PPM) indicator, a first pointer to a first translation structure, and a second pointer to a second translation structure;
   wherein the PPM indicator is to specify which of three translation modes is to be used in an address translation, the three translation modes to include a first mode in which only the first translation structure is to be used, a second mode in which only the second translation structure is to be used, and a third mode in which both the first and the second translation structures are to be used; and
   context table lookup circuitry to find a context-entry in a context table, the context-entry to point to the PASID table and to include a translation-type field to specify whether to block the memory access transaction if it does not include the PASID instead of enabling single-root input/output virtualization if the memory access transaction does not include the PASID.

2. The apparatus of claim 1, further comprising root table lookup circuitry to find a root-entry in a root table, the root-entry to point to the context table.

3. The apparatus of claim 1, wherein the address translation is to be performed on an address from the memory access transaction.

4. The apparatus of claim 1, wherein the address translation is from a virtual address to a host physical address.

5. The apparatus of claim 1, wherein the address translation is from a guest physical address to a host physical address.

6. The apparatus of claim 1, wherein the address translation is to include a host physical address filtering.

7. The apparatus of claim 1, wherein the address translation is from a direct memory access address to a host physical address.

8. The apparatus of claim 1, wherein the address translation is from a guest virtual address to a host physical address.

9. A method comprising:
- assigning a process address space identifier (PASID) to a command portal through which a client is to submit a work request to an input/output device;
- finding a context-entry in a context table, the context-entry to point to a PASID table;
- determining, based on a translation-type field in the context-entry, whether to block a memory access transaction if it does not include the PASID instead of enabling single-root input/output virtualization if the memory access transaction does not include the PASID;
- using the PASID to find a PASID-entry in a PASID-entry in the PASID table, the PASID-entry to include a PASID processing mode (PPM) indicator, a first pointer to a first translation structure, and a second pointer to a second translation structure, wherein the PPM indicator is to specify which of three translation modes is to be used in an address translation, the three translation modes to include a first mode in which only the first translation structure is to be used, a second mode in which only the second translation structure is to be used, and a third mode in which both the first and the second translation structures are to be used; and
- performing the address translation in the specified mode.

10. The method of claim 9, further comprising finding a root-entry in a root table, the root-entry to point to the context table.

11. The method of claim 9, wherein the address translation is from a virtual address to a host physical address.

12. The method of claim 9, wherein the address translation is a guest physical address to a host physical address translation.

13. The method of claim 9, wherein the address translation is to include a host physical address filtering.

14. The method of claim 9, wherein the address translation is from a direct memory access address to a host physical address.

15. The method of claim 9, wherein the address translation is from a guest virtual address to a host physical address.

16. A system comprising:
- a system memory;
- an input/output device to initiate a transaction to the system memory; and
- an input/output memory management unit, including:
  - process address space identifier (PASID) table lookup circuitry to find, using a PASID from the transaction, a PASID-entry in a PASID table, wherein the PASID is assigned to a command portal through which a client is to submit a work request to the input/output device, the PASID-entry to include a PASID processing mode (PPM) indicator, a first pointer to a first translation structure, and a second pointer to a second translation structure, wherein the PPM indicator is to specify which of three translation modes is to be used in an address translation, the three translation modes to include a first mode in which only the first translation structure is to be used, a second mode in which only the second translation structure is to be used, and a third mode in which both the first and the second translation structures are to be used; and
  - context table lookup circuitry to find a context-entry in a context table, the context-entry to point to the PASID table and to include a translation-type field to specify whether to block the transaction if it does not include the PASID instead of enabling single-root input/output virtualization if the memory access transaction does not include the PASID.

* * * * *